United States Patent [19]

Takagi et al.

[11] Patent Number: 5,742,852
[45] Date of Patent: Apr. 21, 1998

[54] PHOTOMETRY SYSTEM

[75] Inventors: Tadao Takagi; Masaru Muramatsu; Hiroyuki Iwasaki, all of Kanagawa-ken, Japan

[73] Assignee: Nikon Corporation, Tokyo, Japan

[21] Appl. No.: 713,438

[22] Filed: Sep. 17, 1996

Related U.S. Application Data

[63] Continuation of Ser. No. 366,772, Dec. 30, 1994, abandoned.

[30] Foreign Application Priority Data

Apr. 25, 1994 [JP] Japan ................................. 6-086768

[51] Int. Cl.⁶ ..................................................... G03B 7/08
[52] U.S. Cl. ........................................... 396/229; 396/234
[58] Field of Search .................................. 396/233, 234, 396/228, 229, 230; 356/222; 250/214 P, 214 L

[56] References Cited

U.S. PATENT DOCUMENTS 5,450,163  9/1995  Iwasaki .................................. 354/432
5,521,673  5/1996  Iwasaki .................................. 396/234

*Primary Examiner*—W. B. Perkey
*Attorney, Agent, or Firm*—Oliff & Berridge, PLC

[57] ABSTRACT

A photometric system is provided in which the value is obtained when the center-weighted photometric value and the like are determined from a plurality of separate photometric outputs is the same value that is obtained when photometry is accomplished on the same area when it is treated as a single cell. The photometric system includes a photometric element which divides the subject field into regions in order to measure the light quantity, a photometric mode selection unit which selects a photometric mode, a plurality of addition units which add together certain outputs from the outputs of the photometric element 11 in accordance with the selection made by a photometric mode selection switch, and a logarithm conversion unit which converts the output of the plurality of addition units into logarithms.

27 Claims, 7 Drawing Sheets

PHOTOMETRY SYSTEM

This is a Continuation of application Ser. No. 08/366,772 filed Dec. 30, 1994, now abandoned.

BACKGROUND OF THE INVENTION

1. Field of the Invention

This invention relates to a photometry system which divides the subject field into regions in order to measure light quantities.

2. Description of Related Art

Conventionally, a model of this type of photometry system has been disclosed in, for example, Japanese unexamined patent publication 3-7920. In this reference, the photometry value of a spot area is compared by a comparison means with a preset value. When the photometry value is at least as great as the preset value, the exposure value of the center-weighted photometry mode is determined from the photometry value of the spot area and ring-like areas positioned outside of the spot area.

However, in this conventional photometry system, the center-weighted photometry value and the like are calculated by addition only after converting the outputs of the various photometry sections into logarithms. Therefore, the information in dim areas tends to be emphasized compared to photometry conducted on the same areas when treated as single cells.

SUMMARY OF THE INVENTION

Therefore, this invention provides a photometric system in which the same value is obtained, whether by calculating the center-weighted photometric value and the like from a plurality of separate photometric outputs, or when photometry is conducted on the same area treated as a single cell.

In order to achieve this and other objectives, a first embodiment of the photometric system of this invention comprises a photometric unit which divides the subject field into regions in order to measure light quantities, a plurality of addition units which select certain outputs from the outputs of the photometric unit, and add them together, and a logarithm conversion unit which converts the output values of the addition units into corresponding logarithm values.

A second preferred embodiment of the photometry means of this invention comprises the photometric unit which divides the subject field into regions in order to measure light quantities, a photometric mode selection unit which selects a photometric mode, the plurality of addition units which select certain outputs from the outputs of the photometric unit based on the selection made by the photometric mode selection unit and add these outputs together, and a logarithm conversion unit which converts the output values of the addition units into corresponding logarithm values.

In a third preferred embodiment, the photometric system of the first or second preferred embodiments further comprises a recording unit which stores the output logarithm values of the logarithm conversion unit.

In a fourth preferred embodiment, the photometric system of one of the first, second or third preferred embodiments further comprises an A/D converter which converts the outputs of the photometric unit from analog to digital and outputs the results to the addition units.

In a fifth preferred embodiment, in the photometric system of one of the first to fourth preferred embodiments, each addition unit performs addition on a corresponding one of a plurality of selected groups of the regions.

In a sixth preferred embodiment, in the photometric system of one of the first to fifth preferred embodiments, under preset conditions the addition units group the outputs of the photometric unit into groups which are fewer in number than the total number of regions of the photometric unit, and then add the regions within each group together.

In a seventh preferred embodiment, in the photometric system of one of the first to sixth preferred embodiments, the preset conditions in the addition units exist when the brightness of the subject field is dim.

In an eighth preferred embodiment, in the photometric system of one of the first to seventh preferred embodiments, the addition units add together the regions within the spot photometric area, the center-weighted photometric areas, and one or more perimeter photometric areas as separate groups.

In a ninth preferred embodiment, in the photometric system of one of the second to eighth preferred embodiments, the photometric mode selection unit has a spot photometric mode as a possible selection.

In a tenth preferred embodiment, in the photometric system of one the second to ninth preferred embodiments, the photometric mode selection unit has a center-weighted photometric mode as a possible selection.

According to the preferred embodiments of the invention as set forth above, the addition units add together certain pre-selected outputs from the outputs of the photometric units, and the logarithm conversion unit conducts logarithm conversion of the outputs of the addition units. Consequently, the same value can be obtained, whether by calculating the center-weighted photometric value and the like from a plurality of separate photometric outputs, or when photometry is conducted on the same area treated as a single cell.

These and other features and advantages of the invention are described in or apparent from the following detailed description of the preferred embodiments.

BRIEF DESCRIPTION OF DRAWINGS

The preferred embodiments of this invention will be described in detail, with reference to the following figures, wherein.

DETAILED DESCRIPTION OF PREFERRED EMBODIMENTS

Figure 1:
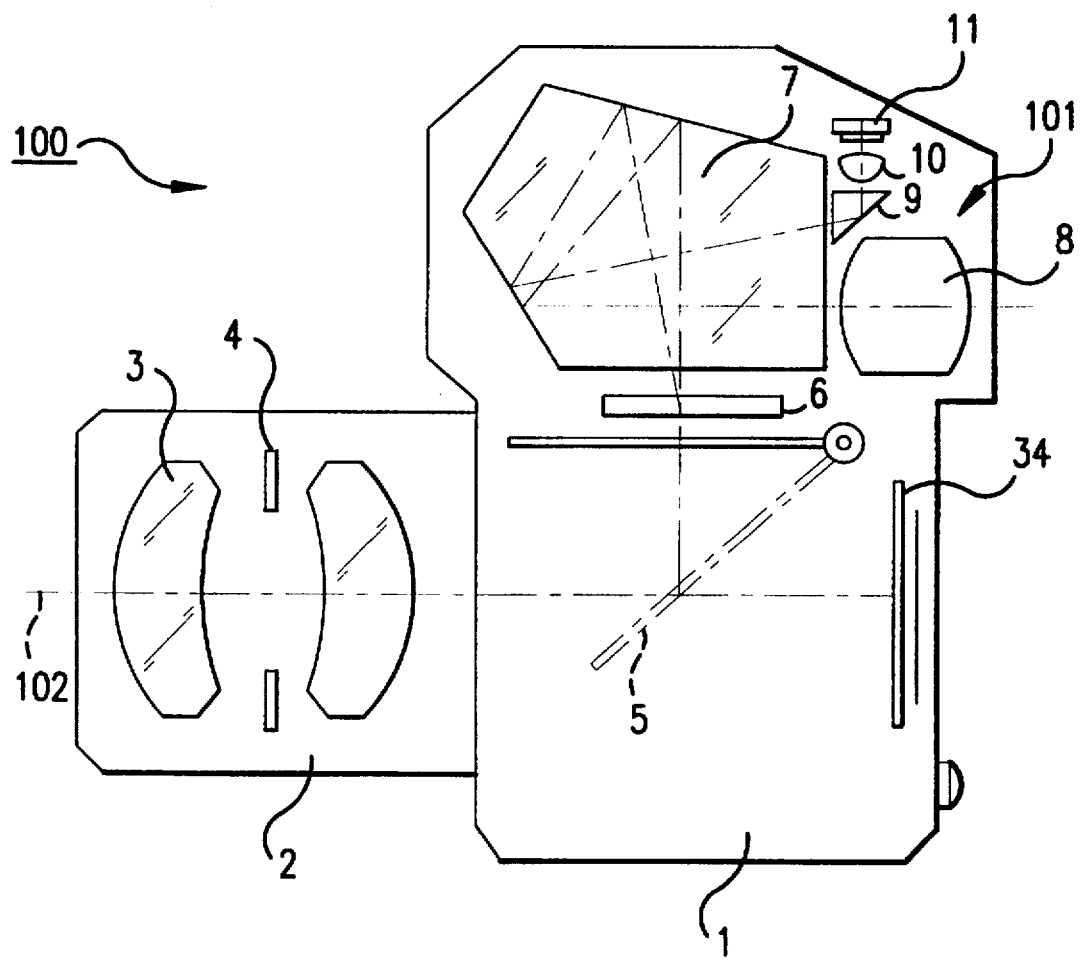
FIG. 1 is a cut-away top view showing the schematic structure of one preferred embodiment of a camera incorporating the photometric system according to this invention.

As shown in FIG. 1, the photometric system 200 is incorporated into a single lens reflex camera 100 in which, when observation is accomplished through the viewfinder 101, light rays 102 from the subject field pass through a shooting lens 3 and a diaphragm 4 provided in a shooting lens barrel 2. The light rays 102 are reflected by a main mirror 5 in the camera body 1, and reach the eye of the photographer by passing through a screen 6, a pentagonal prism 7, and an eyepiece lens 8. The position of the main mirror 5 when the light rays 102 are reflected to the eyepiece lens 8 are shown by the dashed lines, while the position of the main mirror 5 when the light rays expose the film 34 is shown in solid lines.

Figure 2:
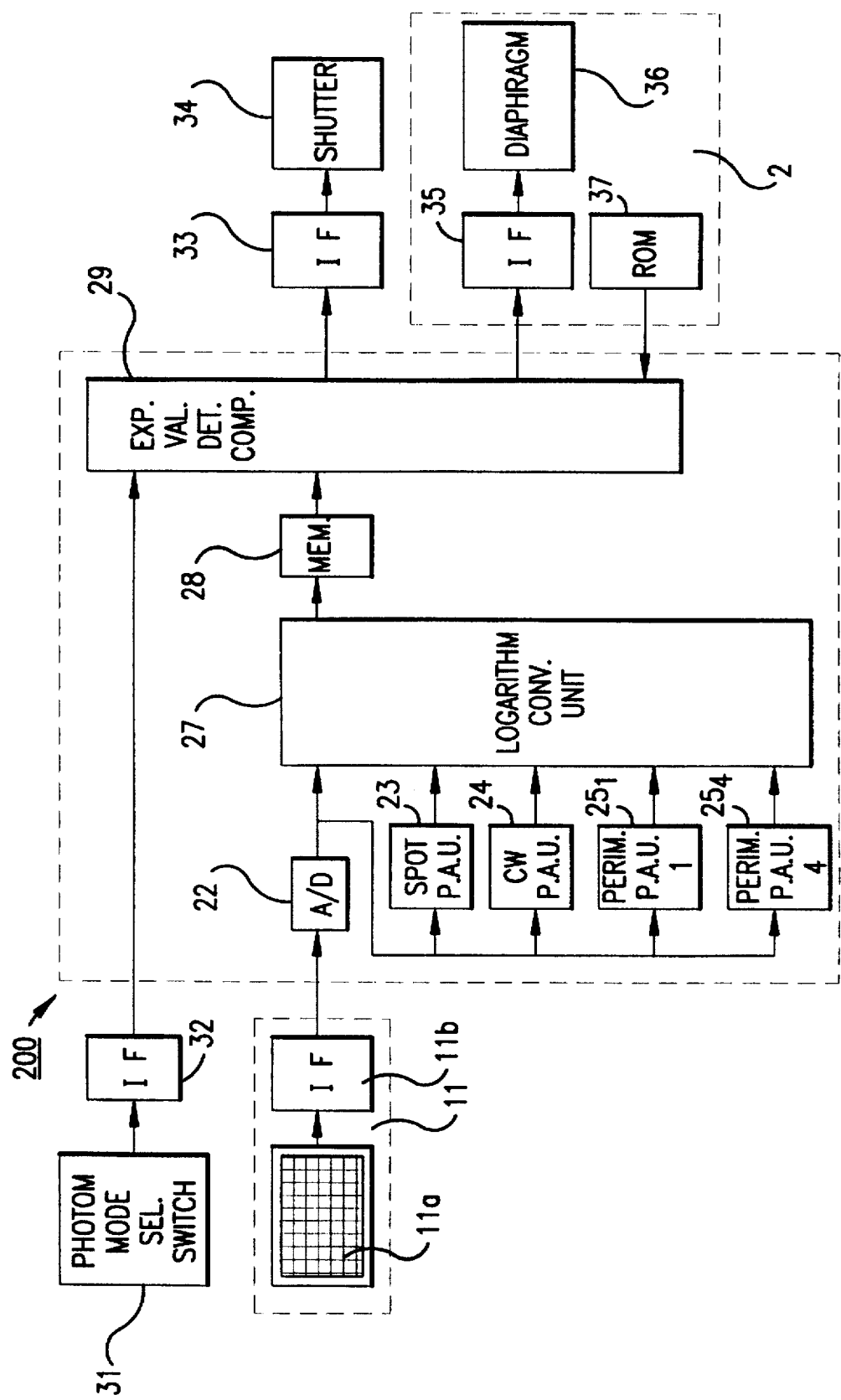
FIG. 2 is a block diagram showing in detail the first preferred embodiment of the photometric system according to this invention.

In addition, a portion of the light rays reaches a photometric element 11 of the photometric system 200 by passing from the pentagonal prism 7 through a prism 9 and a collecting lens 10. The photometric element 11 is formed by a two-dimensional charge coupled device (CCD) 11a, as shown in FIG. 2. As shown in FIG. 3A, the CCD 11a element has a structure wherein the subject field is divided into 345 regions, comprising a grid 23 regions across by 15 regions high. The regions of the CCD 11a output values corresponding to the brightness of the regions.

The photometric element 11 is formed by the CCD 11a and an interface circuit 11b positioned inside the photometric element 11. The outputs from the CCD 11a are input into a CPU 21 via the interface circuit 11b.

The CPU 21 also includes an A/D converter 22, which converts the analog signals from the photometric element 11 into digital signals. The digital signals are input into a spot photometric addition unit 23, a center-weighted photometric addition unit 24, four perimeter region addition units $25_1$–$25_4$ and a logarithm conversion unit 27.

Figure 3B:
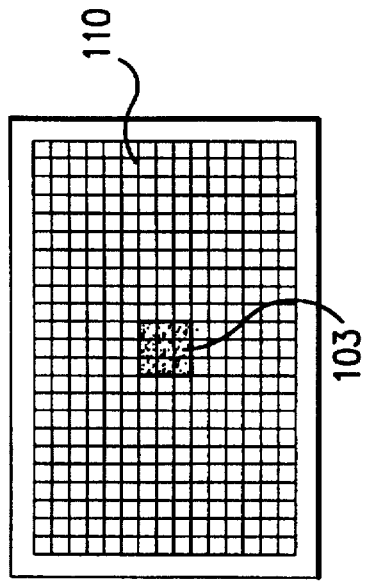
FIGS. 3A–3D show the various regions defined within the photometric element of the photometric system.
Figure 3D:
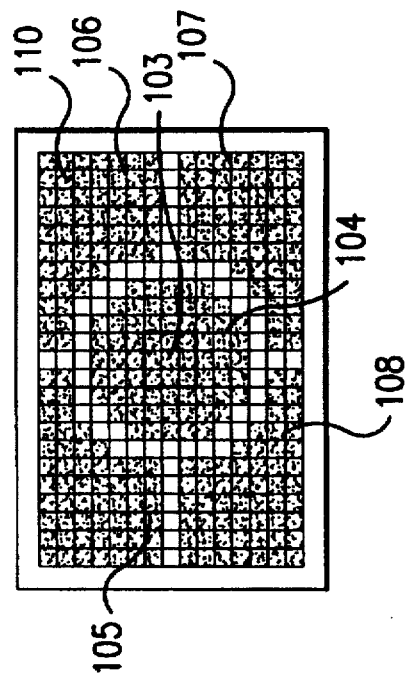
Figure 3A:
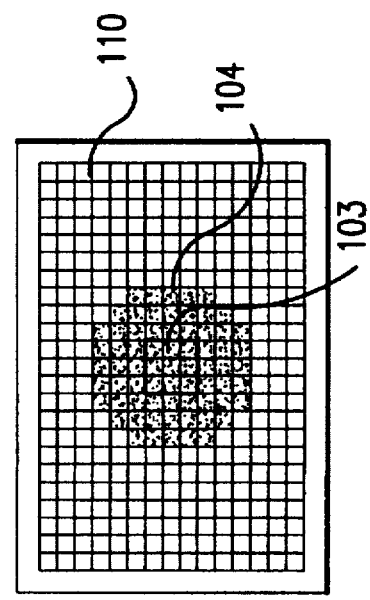
Figure 3C:
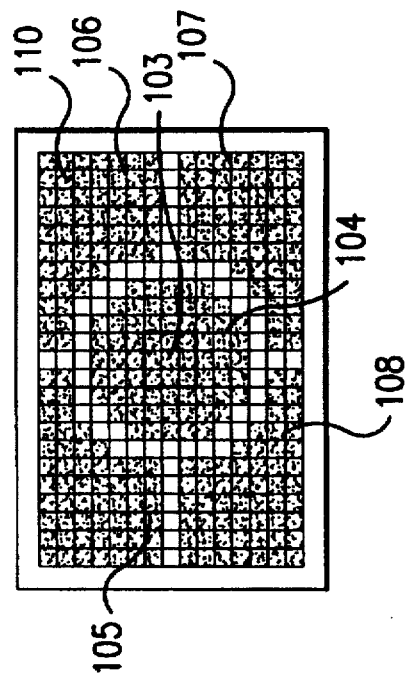

FIGS. 3A–3D show the photometric regions of the photometric system 200 according to this invention. FIG. 3A shows the division of the photometric element 11 into the 345 regions of the CCD 11a. FIG. 3B shows the configuration of the photometric element 11 when a spot photometry mode is selected or used. FIG. 3C shows the configuration of the photometric element 11 when a center-weighted photometry mode is selected or used. FIG. 3D shows the configuration of the photometric element 11 when a multi-pattern (in this case, five-division) photometry mode is selected or used.

Figure 4:
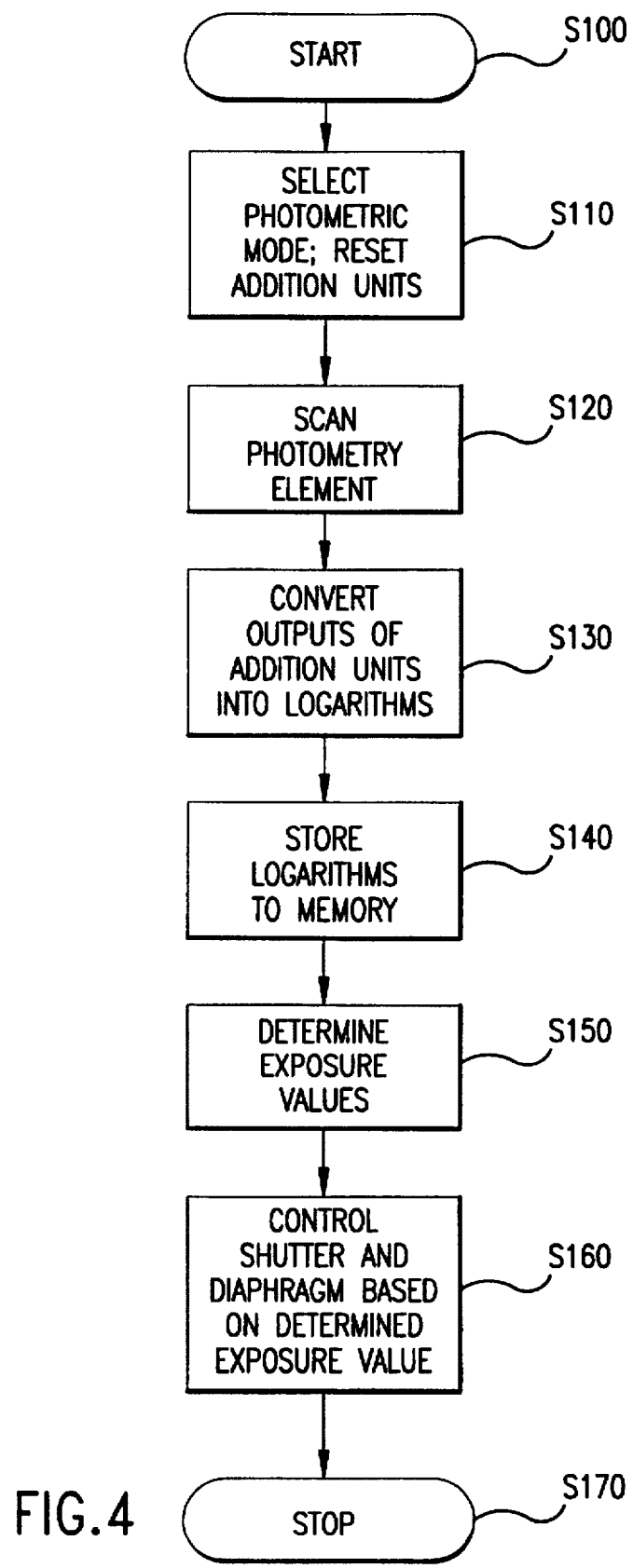
FIG. 4 is a flowchart outlining the overall operation of a camera incorporating the photometric system of this invention.

FIG. 4 is a flowchart which outlines the method for operating the addition units 23, 24 and $25_1$–$25_4$ of the photometric system 200 of this invention. The spot photometric addition unit 23 determines the arithmetic mean of the photometric outputs of the nine regions in the spot photometric area 103 of the subject field 110 of the photometric element 11, as shown in FIG. 3B. The determined arithmetic mean is output to the logarithm conversion unit 27 and converted into a logarithm. Thus, the value of the logarithm obtained from the spot photometric addition unit is the same as would have been obtained if photometry was performed on the spot photometric area 103 treated as a single cell. Specifically, each time the output of the photometric element 11 is for a region located within the spot photometric area 103, the output of the photometric element 11 is added to the spot photometric addition unit 23.

The center-weighted photometric addition unit 24 determines the arithmetic mean of the photometric outputs of the 69 regions in the center-weighted photometric area 104 of the subject field 110 of the photometric element 11, as shown in FIG. 3C. The determined arithmetic mean is output to the logarithm conversion unit 27 and converted into a logarithm. Thus, the value of the logarithm obtained from the center-weighted photometric addition unit 24 is the same as would have been obtained if photometry was performed on the center-weighted photometric area 104 treated as a single cell. Specifically, each time the output of the photometric element 11 is for a region located within the center-weighted photometric area 104, the output of the photometric element 11 is added to the center-weighted photometric addition unit 24.

The four perimeter photometric addition units $25_1$–$25_4$ each determines the arithmetic mean of the photometric outputs of regions within one of the four perimeter photometric groups 105–108 of the subject field 110 of the photometry element 11, as shown in FIG. 3D. In each perimeter photometric group 105–108, there are 55 regions. The determined arithmetic means are output to the logarithm conversion unit 27 and converted into logarithms. Thus, for each of the four perimeter addition units $25_1$–$25_4$, the value of the corresponding logarithm obtained from the corresponding perimeter photometric addition unit $D5_1$–$25_4$ is the same as would have been obtained if photometry was performed on the perimeter photometric groups 105–108, with each group being treated as a single cell. Specifically, each time the output of the photometric element 11 is for a region located within one of the four perimeter photometric groups 105–108, the output of the photometric element 11 is added to the corresponding one of the four perimeter photometric addition units $25_1$–$25_4$.

The memory unit 28 stores the logarithms of the photometric values of the sum of the 345 regions of the photometry element 11, the logarithm of the spot photometric value, the logarithm of the center-weighted photometric value, and the logarithm of the four perimeter area photometric values, all of which are input to the memory unit 28 after being converted to logarithms by the logarithm conversion unit 27. The memory unit 28 is further connected to an exposure value component 29.

The photometric mode selection switch 31 is used to select the photometric mode. The photographic mode selected by the selection switch 31 is input into the exposure value determining component 29 of the CPU 21 via an interface circuit 32.

The exposure value determining component 29 determines the exposure value based on the outputs from the memory unit 28, the photometric mode selection switch 31 and a ROM provided in the shooting lens barrel 2.

The exposure value determined by the exposure value determining component 29 is used to control the shutter 34, via an interface circuit 33, and the diaphragm 36, via an interface circuit 35. That is, the shutter 34 and the diaphragm 36 are operated based on the exposure value determined by the exposure value component 29.

FIG. 4 is a flowchart detailing the overall operation of the camera 100 incorporating the photometric system 200 of this invention. Starting in step S100, in step S110, the photometric mode selected by the photometric mode selecting switch 31 is determined. At the same time, the values of addition units 23, 24 and $25_1$–$25_4$ are reset to zero. Then, in step S120, the photometry element 11 is scanned to input, for one region at a time, the brightness values from each region of the 345 regions of the CCD 11a. The brightness values from the regions of the CCD 11a are summed into one or more of the addition units 23, 24, and $25_1$–$25_4$.

Then, in step S130, the outputs of the addition units 23, 24 and $25_1$–$25_4$ are converted to logarithms by the logarithm conversion unit 27. Next, in step S140, the logarithms generated by the logarithm conversion unit 27 are stored to the memory 28. Then, in step S150, the exposure value determining component 29 determines the control parameters for the shutter 34 and the diaphragm 36 based on the selected photometry mode selected by the photometric mode selection switch 31, the logarithms stored in the memory 28, and the information supplied from the ROM 37 of the shooting lens barrel 2. Next, in step S160, the shutter 34 and the diaphragm 36 are controlled based on the exposure value determined by the exposure value determining component 29. Then, the operation of the camera 100 stops in step S170.

Figure 5A:
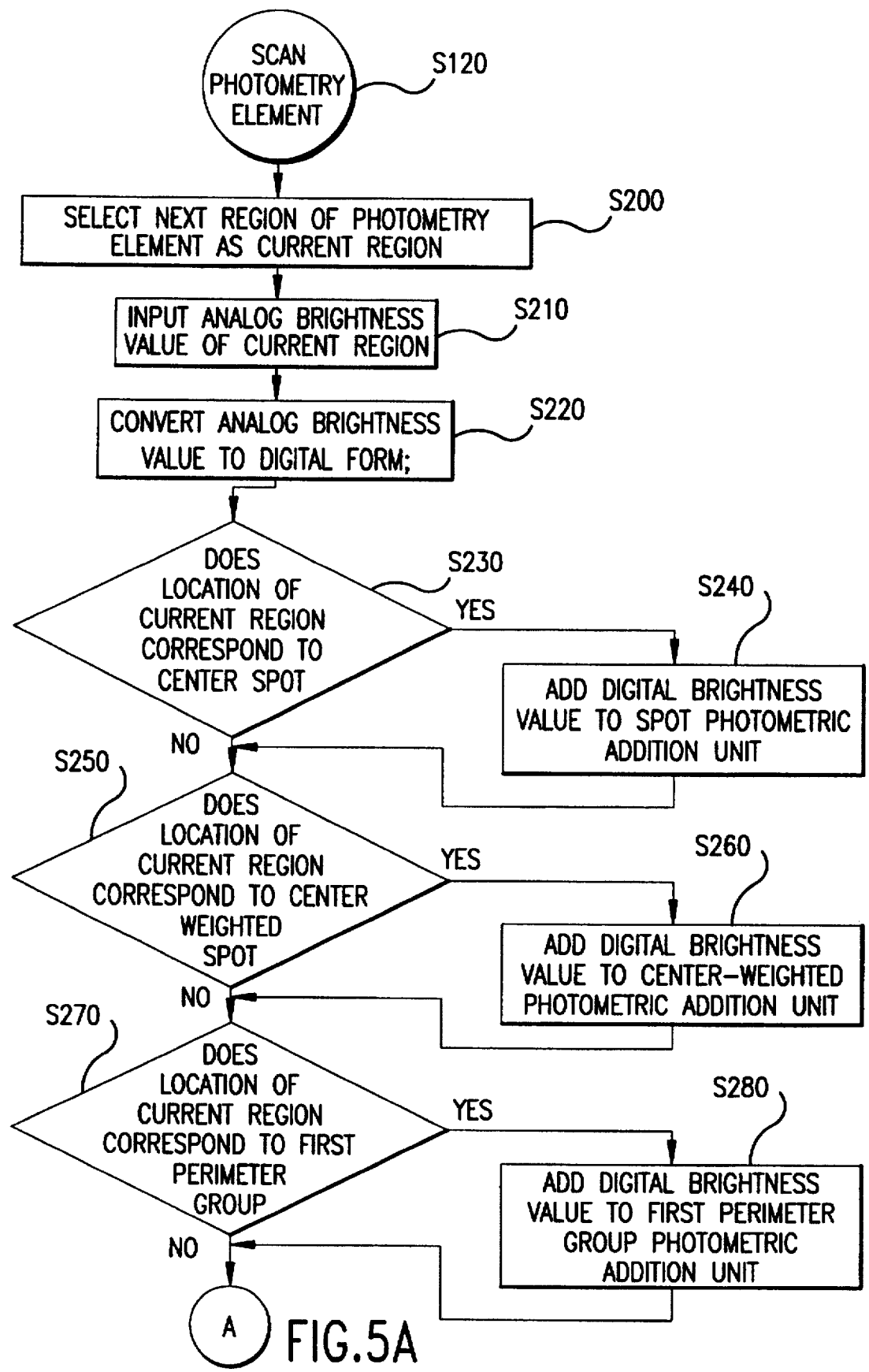
FIGS. 5A and 5B are a flowchart outlining the operation of the photometric element scanning step of FIG. 4.
Figure 5B:
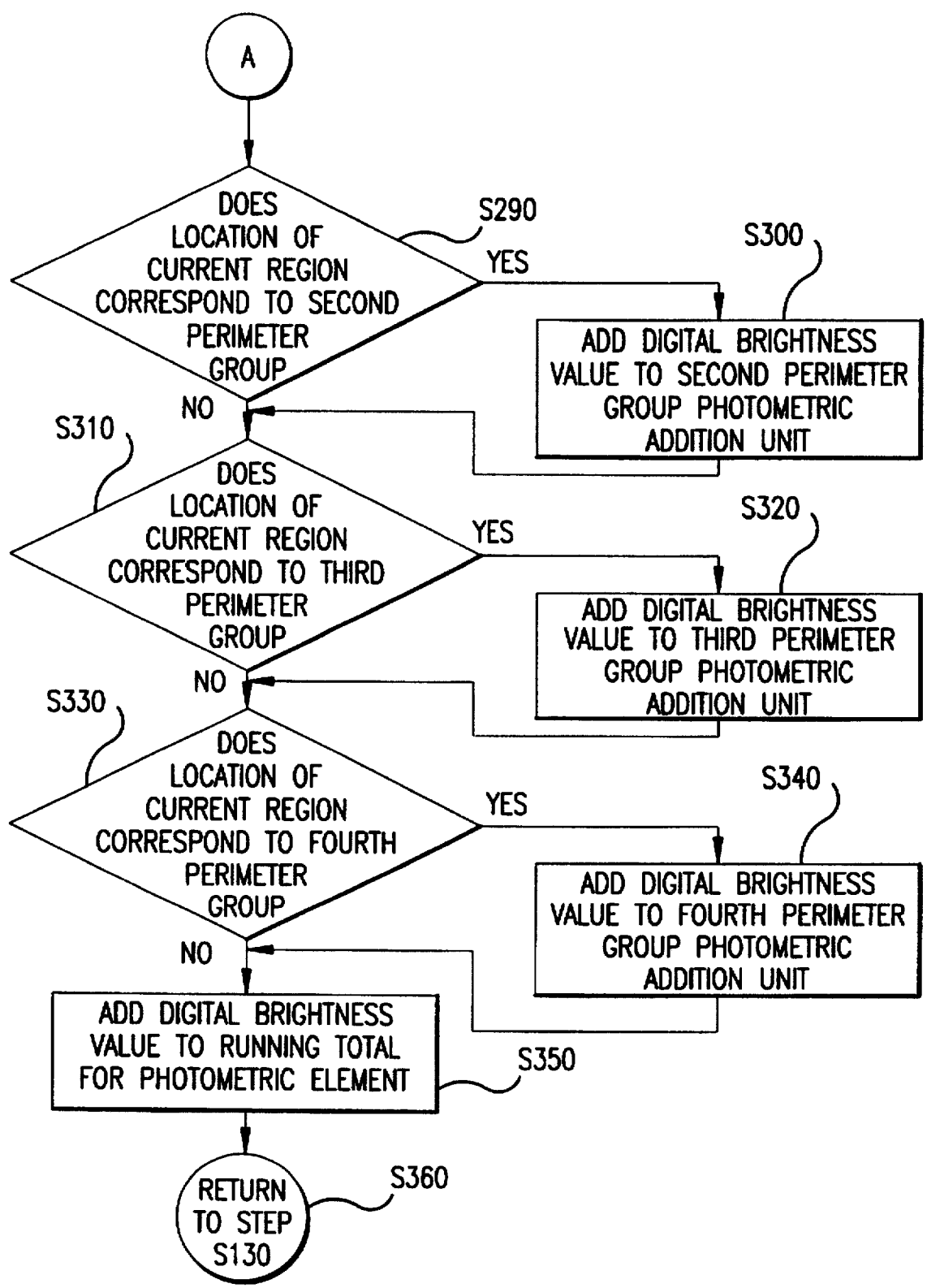

FIGS. 5A and 5B are a flowchart showing in greater detail the scan photometry element step (step S120) of FIG. 4. Starting from step S120, in step S200, the next region of the 345 regions of the CCD 11a of the photometry element 11 is selected as the current region. Then, in step S210, the analog brightness value of the current region is input to the analog-to-digital (A/D) converter 22. Next, in step S220, the A/D converter 22 converts the analog brightness value to digital form and outputs it to the addition units 23, 24 and $25_1$–$25_4$ and the logarithm conversion unit 27.

Then, in step S230, the location of the current region is checked to determine if it corresponds to the spot photometric area 103 shown in FIG. 3B. If the location of the current region does correspond to the spot photometric area 103, control continues to step S240, where the digital brightness value of the current region is added to the spot photometric addition unit 23. Control then continues to step S250. Otherwise, if in step S230, the location of the current region does not correspond to the spot photometric area 103, control jumps directly to step S250.

In step S250, the location of the current region is checked to determine if it corresponds to the center-weighted photometric area 104 shown in FIG. 3C. If the location of the current region does not correspond to the center-weighted photometric area 104, control jumps directly to step S270. Otherwise, if the location of the current region does correspond to the center-weighted photometric area 104, control continues to step S260. In step S260, the digital brightness value of the current region is added to the center-weighted photometric unit 24. Control then continues to step S270.

In step S270, the location of the current region is checked to determine whether it corresponds to the first perimeter photometric group 105 shown in FIG. 3D. If the location of the current region does not correspond to the first perimeter photometric group 105, control jumps directly to step S290. Otherwise, if the location of the current region does correspond to the first perimeter photometric group 105, control continues to step S280. In step S280, the digital brightness value of the current region is added to the first perimeter photometric addition unit $25_1$. Control then continues to step S290.

In step S290, the location of the current region is checked to determine if it corresponds to the second perimeter photometric group 106 shown in FIG. 3D. If the location of the current region does not correspond to the second perimeter photometric group 106, control jumps to step S310. Otherwise, if the location of the current region does correspond to the second perimeter photometric group 106, control continues to step S300. In step S300, the digital brightness value of the current region is added to the second perimeter photometric addition unit $25_2$.

In step S310, the location of the current region is checked to determine if it corresponds to the third perimeter photometric group 107 shown in FIG. 3D. If the location of the current region does not correspond to the third perimeter photometric group 107, control jumps directly to step S330. Otherwise, in step S310, if the location of the current region does correspond to the third perimeter photometric group 107, control continues directly to step S320. In step S320, the digital brightness value of the current region is added to the third perimeter photometric addition unit $25_3$. Control then continues to step S330.

In step S330, the location of the current region is checked to determine if it corresponds to the fourth perimeter photometric group 108 shown in FIG. 3D. If the location of the current region does not correspond to the fourth perimeter photometric group 108, control jumps directly to step S350. Otherwise, in step S330, if the location of the current region does correspond to the fourth perimeter photometric group 108, control continues to step S340. In step S340, the digital brightness value of the current region is added to the fourth perimeter photometric addition unit $25_4$. Control then continues to step S350. In step S350, the digital brightness value for the current region is added to the running total of the digital brightness values for the entire set of 345 regions of the CCD 11a of the photometric element 11. Then, in step S360, control is returned to step S130.

Figure 6:
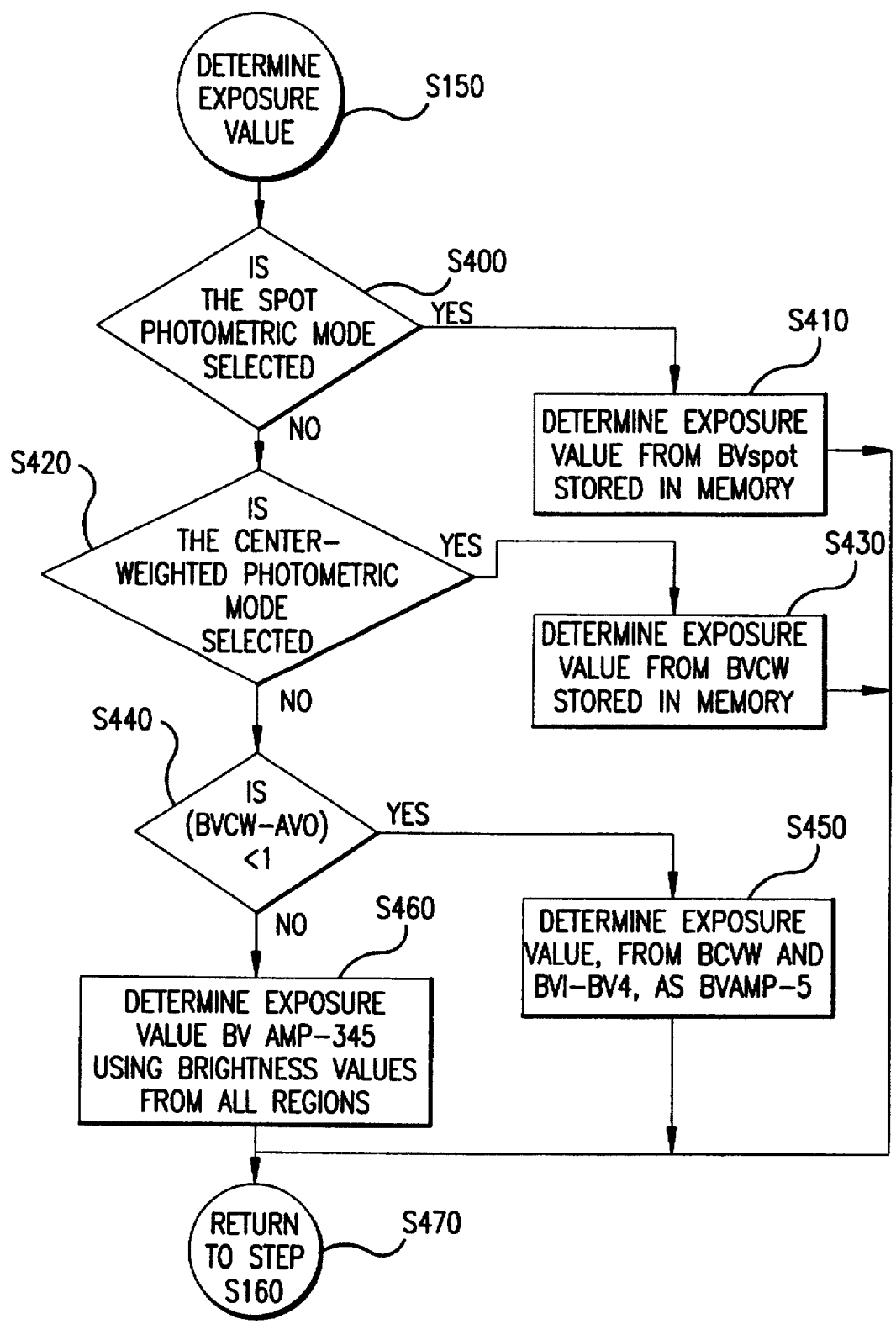
FIG. 6 is a flowchart outlining the operation of the exposure value determining step of FIG. 4.

FIG. 6 is a flowchart outlining in greater detail the operation of the exposure value determining step S150 of FIG. 4. Starting from the exposure value determining step (Step S150), control continues to step S400, which checks the state of the photometric mode selection switch 31 to determine if the spot photometric mode has been selected. If the spot photometric mode is selected, control continues to step S410. In step S410, the exposure value is determined based on the logarithmic conversion of the spot brightness value BVspot output by the spot photometric addition unit 23, which is stored in the memory 28. Then, control continues to step S470, which returns control to step S160.

However, if, in step S400, the spot photometric mode is not selected, control jumps to step S420. In step S420, the state of the photometric mode selection switch 31 is checked to determine if the center-weighted photometric mode is selected. If the center-weighted photometric mode is selected in step S420, control continues to step S430. In step S430, the exposure value is determined from the logarithmic conversion of the center-weighted brightness value BVCW output by the center-weighted photometric addition unit, which is stored in memory 28. Control then jumps to step S470.

However, if, in step S420, the center-weighted photometric mode is not selected, then the division photometric mode, which is also called the multi-pattern photometric mode, must have been selected. Thus, control jumps to step S440. In step S440, the value of the center-weighted brightness value BVCW, less the apex value AV0, is compared to 1. The apex value AV0 is the apex value of the release F value of the shooting lens barrel 2, and is stored in the ROM 37. The value (BVCW-AV0) corresponds to the brightness in the photometric element 11.

In step S440, if the photometric element brightness value is less than 1, control continues to step S450. In step S450, the exposure value is determined from the brightness value BV AMP-5, which is determined from the center-weighted brightness value BVCW and the brightness values BV1–BV4 corresponding to the perimeter regions 105–108. Control then jumps from step S450 to step S470.

Otherwise, in step S440, if the photometric element brightness value is not less than 1, control jumps to step S460. In step S460, the exposure valve BV AMP-345 is determined using photometric brightness value of the sum of the 345 photometric regions in the photometric element 11. Control then continues to step S470.

A detailed description of the method for determining the exposure value BV AMP-345, which is determined using the photometric values from each of the 345 regions, and for determining the exposure value BV AMP-5, which is determined by grouping these regions into five groups, are omitted here. This detailed description is omitted as it is both easily understood by those skilled in the art and not directly related to this invention.

In addition, it should be appreciated that the photometric element can be divided into fewer than, or more than, 5 regions, depending on the number of perimeter photometric addition units defined or provided in the CPU 21.

As described, in this invention, certain preselected portions of the output of the photometric element 11 are added together. Then, logarithm conversion of these portions is accomplished after the addition. Consequently, the value obtained when the center-weighted photometric value and the like are determined from a plurality of separate photometric outputs obtained when photometry is accomplished on the same area as a single cell.

While the present invention has been described with reference to specific embodiments, it is not confined to the specific details set forth, but is intended to cover such modifications or changes as may come within the scope of the following claims.

What is claimed is:

1. A photometry system for a camera, comprising:
   a photometric element having a plurality of photometric regions, each photometric region measuring a brightness of a corresponding portion of a subject field;
   a plurality of addition units, each addition unit adding together the brightness outputs of a selected group of the plurality of photometric regions;
   a logarithmic conversion unit which converts output values of the plurality of addition units into logarithmic values; and
   a user operable photometric mode selection switch that selects among a plurality of different modes based on operation by a user, wherein each mode corresponds to a different one of the plurality of addition units.

2. The photometry system of claim 1, further comprising a memory storing the logarithmic values output by the logarithmic conversion unit.

3. The photometry system of claim 1, further comprising an analog-to-digital converter which converts an analog output of the photometric regions to a digital output.

4. The photometry system of claim 1, wherein, when a predetermined condition occurs, a number of the selected groups is less than a number of the photometric regions, the converted logarithmic values of the selected groups being added together.

5. The photometry system of claim 4, wherein the predetermined condition is a brightness of the subject field being below a predetermined brightness value.

6. The photometry system of claim 4, wherein the predetermined condition is:

$$BVCW - AV0 < 1$$

where:
   BVCW is a logarithmic conversion of a brightness value of a center-weighted photometric area; and
   AV0 is an apex value.

7. The photometry system of claim 1, wherein, for each of the plurality of addition units, the corresponding selected groups of the plurality of photometric regions comprise one of at least a spot photometric area, a center-weighted photometric area, and at least one perimeter photometric area.

8. The photometric system of claim 1, wherein the photometric mode selection switch selects one of at least a spot photometry mode, a center-weighted photometry mode, and a multi-pattern photometry mode.

9. The photometric system of claim 1, further comprising an exposure value determining device, which determines exposure values from the logarithmic output corresponding to a selected one of the plurality of addition units, the selected addition unit corresponding to the photometric mode selected by the photometric mode selection switch.

10. A photometry system for a camera, comprising:
    photometric measurement means for measuring brightness of a subject field and having a plurality of photometric regions;
    addition means for adding together the brightness outputs of selected groups of the plurality of photometric regions;
    logarithmic conversion means for converting output values of the addition means into logarithmic values; and
    photometric mode selection means for selecting among a plurality of different photometric modes based on a user operable selection switch operated on by a user.

11. The photometry system of claim 10, further comprising memory means for storing the logarithmic values output by the logarithmic conversion means.

12. The photometry system of claim 10, further comprising an analog-to-digital conversion means for converting an analog output of the photometric measurement means to a digital output.

13. The photometry system of claim 10, wherein, when a predetermined condition occurs, a number of the selected groups is less than a number of the photometric regions, the converted logarithmic values of the selected groups being added together.

14. The photometry system of claim 13, wherein the predetermined condition is a brightness of the subject field being below a predetermined brightness value.

15. The photometry system of claim 13, wherein the predetermined condition is:

$$BVCW - AV0 < 1$$

where:
   BVCW is a logarithmic conversion of a brightness value of a center-weighted photometric area of the photometric measurement means; and
   AV0 is an apex value.

16. The photometry system of claim 10, wherein, the selected groups summed by the addition means comprise at least a spot photometric area, a center-weighted photometric area, and at least one perimeter photometric area.

17. The photometric system of claim 10, wherein the photometric mode selection means selects one of at least a spot photometry mode, a center-weighted photometry mode, and a multi-pattern photometry mode.

18. The photometric system of claim 10, further comprising an exposure value determining means for determining exposure values from the logarithmic output corresponding to the photometric mode selected by the photometric mode selection switch.

19. A method for determining brightness values using a photometry system of a camera, comprising the steps of:
    selecting among a plurality of photometric modes using a user operable selection switch operated on by a user;
    measuring brightness of a subject field using a photometric element having a plurality of photometric regions;
    outputting measured brightness values of corresponding portions of the subject field from the plurality of photometric regions;

adding together the brightness outputs of a selected group of the plurality of photometric regions based on the selected photometric mode; and converting the sum of the selected group of the plurality of photometric regions into a logarithmic value.

20. The method of claim 19, further comprising the step of storing the logarithmic value.

21. The method of claim 19, further comprising the step of analog-to-digital converting an analog output of the photometric regions to a digital output.

22. The method of claim 19, wherein, when a predetermined condition occurs, a number of the selected groups is less than a number of the photometric regions, the converted logarithmic values of the selected groups being added together.

23. The method of claim 22, wherein the predetermined condition is a brightness of the subject field being below a predetermined brightness value.

24. The method of claim 22, wherein the predetermined condition is:

$$BVCW - AV0 < 1$$

where:
BVCW is a logarithmic conversion of a brightness value of a center-weighted photometric area; and
AV0 is an apex value.

25. The method of claim 19, wherein the selected group of the plurality of photometric regions comprises one of at least a spot photometric area, a center-weighted photometric area, and at least one perimeter photometric area.

26. The method of claim 19, wherein the step of selecting a photometric mode comprises the step of selecting one of at least a spot photometry mode, a center-weighted photometry mode, and a multi-pattern photometry mode.

27. The method of claim 19, further comprising the step of determining an exposure value from the logarithmic output corresponding to the selected group of the plurality of photometric regions, the selected group corresponding to the selected photometric mode.

* * * * *